United States Patent [19]

Ikumi

[11] Patent Number: 5,630,084
[45] Date of Patent: May 13, 1997

[54] SYSTEM FOR CONVERTING DATA IN LITTLE ENDIAN TO BIG ENDIAN AND VICE VERSA BY REVERSING TWO BITS OF ADDRESS REFERENCING ONE WORD OF FOUR WORDS

[75] Inventor: Nobuyuki Ikumi, Tokyo, Japan

[73] Assignee: Kabushiki Kaisha Toshiba, Kawasaki, Japan

[21] Appl. No.: 872,359

[22] Filed: Apr. 23, 1992

[30] Foreign Application Priority Data

Apr. 25, 1991 [JP] Japan ........................... 3-095666

[51] Int. Cl.⁶ ........................................... G06F 9/30
[52] U.S. Cl. ................................. 395/376; 395/800
[58] Field of Search ........................... 395/375, 400, 395/425, 775, 800, 325, 500, 700; 364/715.09, 715.1, 715.11, 724.16

[56] References Cited

U.S. PATENT DOCUMENTS

| | | | |
|---|---|---|---|
| 4,580,240 | 4/1986 | Watanabe | 395/445 |
| 4,814,976 | 3/1989 | Hansen | 395/375 |
| 4,959,779 | 9/1990 | Weber et al. | 395/775 |
| 5,088,023 | 2/1992 | Nakamura et al. | 395/430 |
| 5,101,498 | 3/1992 | Ehlig et al. | 395/800 |
| 5,107,415 | 4/1992 | Sato et al. | 395/800 |
| 5,132,898 | 7/1992 | Sakamura et al. | 395/310 |
| 5,398,328 | 3/1995 | Weber et al. | 395/500 |

*Primary Examiner*—Thomas C. Lee
*Assistant Examiner*—Moustafa M. Meky
*Attorney, Agent, or Firm*—Oblon, Spivak, McClelland, Maier & Neustadt, P.C.

[57] ABSTRACT

A data processing device including: data processor handling at one time a plurality of data such as instructions each consisting of one word; a plurality of input ports for inputting a plurality of data; a memory for storing temporarily the data inputted through the input pins, each of whose elements consisting of one byte; and exclusive OR gates for designating each of the elements of the memory. Each portion of a memory element is referenced by a byte address each consisting two bits wherein when the information device can handle data formed in a Little-endian-type, in which the address are increased in sequence from the byte on the Least significant Bit (LSB), and the data is formed in a big-endian-type, in which the byte address are increased in sequence from the byte on the Most Significant Bit (MSB), the exclusive OR gates reverse some of the bits of each byte address.

3 Claims, 9 Drawing Sheets

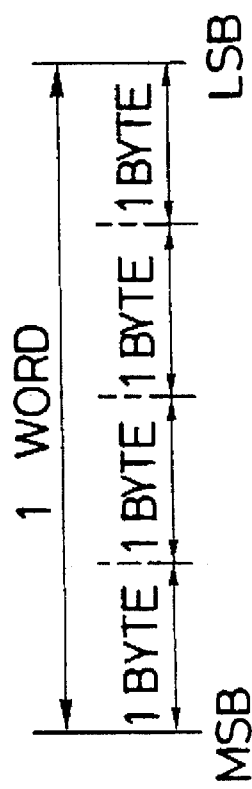

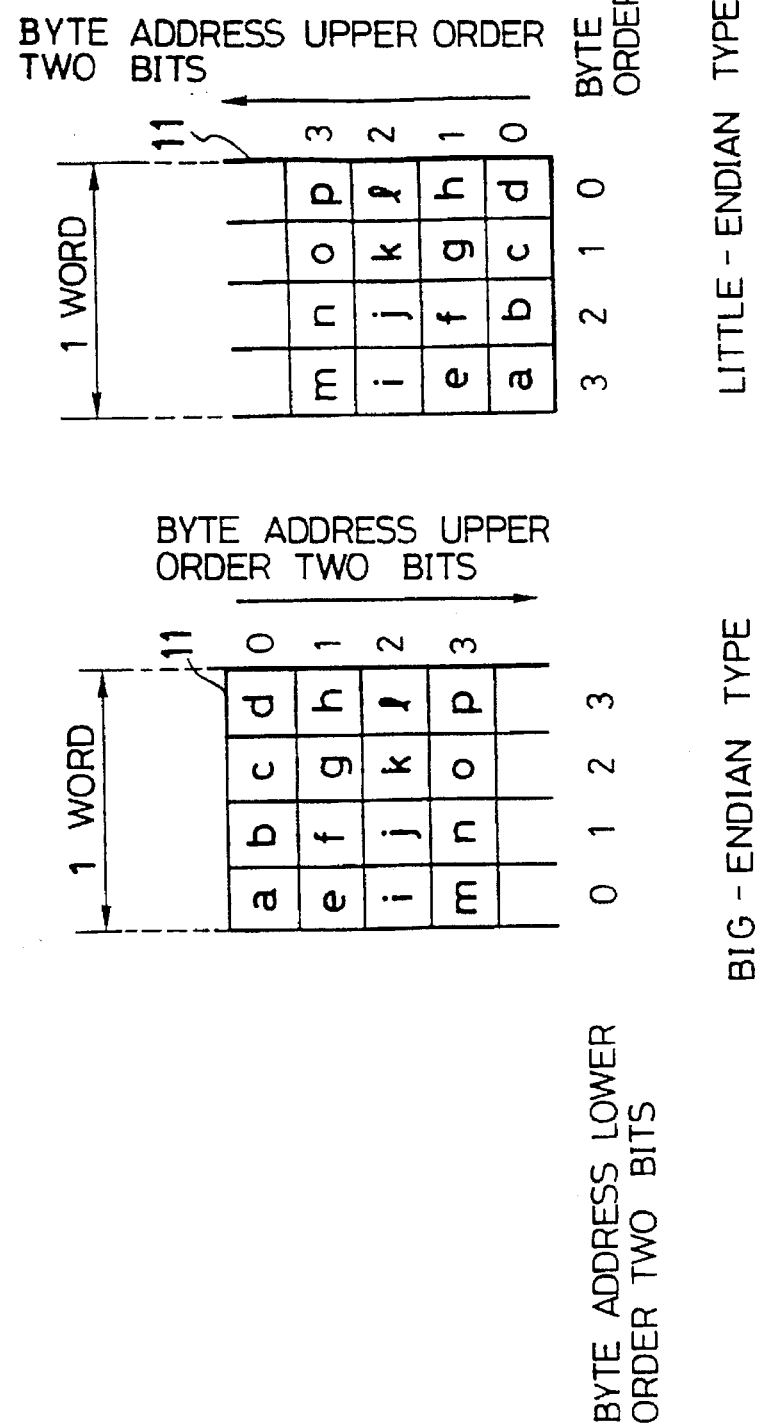

SYSTEM FOR CONVERTING DATA IN LITTLE ENDIAN TO BIG ENDIAN AND VICE VERSA BY REVERSING TWO BITS OF ADDRESS REFERENCING ONE WORD OF FOUR WORDS

BACKGROUND OF THE INVENTION

1. Field of the Invention

The present invention relates to a data processing device for a super-scalar-type or VLIW-type RISC type processor which can simultaneously execute a plurality of instructions, with one instruction made up of at least one word of data or more, and, in particular, to a data processing device in which different types of data are stored in an external memory other than that of the data which is to be executed on by the processor.

2. Description of the Prior Art

There is no uniform standard method for affixing an address to data in byte (8-bit) units for data used in a computer system. At the present time two types of systems exist. As shown in FIG. 1A, one system is the big-endian-type in which the addresses are increased, in sequence, from the byte on the Most Significant Bit (MSB) side, and, conversely, the other system is the little-endian-type in which the addresses are increased in sequence from the byte on the Least Significant Bit (LSB) side.

For this reason when the data is accessed in byte units, the order of input of byte data for the two methods is opposite and problems are produced during data exchange with respect to compatibility.

On the other hand, a recent trend has been toward a processor, as the mainstream, in which a plurality of instructions can be executed simultaneously at high speed in one cycle, using both a super-scalar system and a VLIW system in an RISC processor.

These processors are provided with a wide bus so that large amounts of data can be transmitted at one time (for example, a width of four words, which would be 128 bits) even when the data is exchanged between the processor and an external memory. In addition, a large number of connector pins are provided for the external memory. For example, in the case of a processor which can accommodate four words (128 bits; one word=32 bits) at one time from an external memory, data written in by the big-endian type or the little-endian type is recorded with an external memory 11, in the order as shown in FIG. 1B. This data passes through the connector pins and is input in the sequence shown in FIG. 1C.

Specifically, the data is written in from the four groups of connector pins A, B, C, D (one group comprises 32 connector pins, specifically 32 bits) in the sequence shown in the drawing. The internal hardware of a conventional processor 13 is constructed to process data produced in either the big-endian type or the little-endian type, so that when accessing data of a different form the following two problems exist. The first problem stems from the reversal of the sequence for each individual piece of data of byte units within one word (32 bits).

The second problem is the point that the sequence of four words of data is reversed. In order to cope with data drawn up in the two types—the big-endian—and the little-endian-types—a switching circuit 14 for data of byte units made up of a selector (SEL), as shown in FIG. 2, is necessary to handle the problem of reversal of the byte sequence. Even when this circuit 14 is provided, the second problem still remains when data of word units drawn up by the big-endian and the little-endian types is read in through the connector pins A to D as a result of the reversal of the sequence of the words for both types, as shown in FIG. 1C. Specifically, the problem of the reversal of the sequence of the words exists.

As shown in FIG. 3, in the case of a processor of the super-scalar-type or the like, a plurality of instructions in word units is simultaneously read in from the external memory and introduced into an instruction register 12 provided in a processor chip 18. As stated above, the internal hardware of the processor chip 13 is set and formed in accordance with either the big-endian-type or the little-endian-type. For this reason, the sequence of input instructions in word units ends up reversed for data drawn up by the different endian types. Accordingly, the correct control of calculation and processing by means of the processor 13 is impossible.

In order to avoid this, a method for exchanging data has been considered, as shown in FIG. 4, in which a SEL 15 (selector) is newly provided inside the processor immediately before the instruction register 12, in addition to the switching circuit 14 shown in FIG. 2. This selector is for switching the order of the words. However, because the above-mentioned byte switching circuit 14 must also be provided, the size of the chip is considerably increased in comparison with the data bus width, because of the bus wiring, namely the configuration of the circuit and the like is increased in practice.

Even when the selector 15 shown in FIG. 4 is provided, the following problems remain. For example, when double precision floating point data is handled, double precision data with a format of two words in series, as shown in FIG. 5A, ends up with a format as shown in FIG. 5B when changed by each word unit. In FIG. 5A and 5B, an s indicates the sign, an e the exponent, and an f the mantissa of the data.

In this manner, a conventional data processing device must reverse the order of the data in each byte unit for data formed by means of an endian type which differs from the endian type which the device is capable of processing, and, in particular, the order of each word unit of an instruction is reversed so that operational control becomes impossible. Another drawback is that, in the case of operation using data of two or more words in series, the data format is broken Up and rearranged into a format which cannot be utilized.

SUMMARY OF THE INVENTION

An object of the present invention is to provide, with due consideration to the drawbacks of such conventional devices, a data processing device wherein a byte address (two-bit) showing each piece of data entered in byte units is reversed according to the endian type when data in byte units is accessed. In addition, operational control using data drawn up in a different endian type is possible by using a variable method for connecting a plurality of connecting pins which interchange data between the processor and the external memory corresponding to the order in which the data in word units recorded in an external memory is accommodated, so that, even in the case where data such as instructions and the like of two or more words in series is input, operational control is possible.

As a preferred embodiment according to the present invention, a data processing device, comprises:

data processing means handling at one time a plurality of data such as instructions each consisting of one word;
 a plurality of input ports for inputting a plurality of data;

memory means for storing temporarily the data inputted through the input pins, each of whose elements consisting of one byte; and designation means for designating each of the elements of the memory means, consisting of byte address each consisting two bits and designating each element.

In the data processing means, when the information device can handle data formed in a little-endian-type in which the address are increased in sequence from the byte on the Least significant Bit (LSB), and the data is formed in a big-endian-type in which the byte address are increased in sequence from the byte on the Most Significant Bit (MSB), the designating means reverse the bits of each byte address.

In addition, the data processing device of the present invention comprises an internal computing element for computing, using data of two or more words in series, and an exchange means for substituting data in word units.

In the above configuration, when data in byte units is accessed in the present invention, it is possible to cope with data drawn up by either of the big-endian or little-endian types by the reversal of two bits of the byte address which designates a piece of data.

In the present invention the connection of the connector pins to output data such as instructions or the like, can be varied to correspond with the big-endian-type or the little-endian type which is preset for the entire system, when the processor (data processing device) and the external memory (memory device) are connected.

In addition, the data processing device of the present invention is provided with a selector within the processor when processing data connected in a configuration of a plurality of words such as double precision floating point data, and the data of the word units is switched via the selector to correspond to the processing type of the processor, prior to input to a computing element.

BRIEF DESCRIPTION OF THE DRAWINGS

These and other objects, features, and advantages of the present invention will become more apparent from the following description of the preferred embodiment taken in conjunction with the accompanying drawings, in which:

FIG. 1A to FIG. 1C are conceptual diagrams showing the order of data read out by different conventional endian types.

DETAILED DESCRIPTION OF THE PREFERRED EMBODIMENTS

Other features of this invention will become apparent in the course of the following description of exemplary embodiments which are given for illustration of the invention and are not intended to be limiting thereof. An embodiment of the present invention will now be explained. based on the drawings.

Figure 1C:
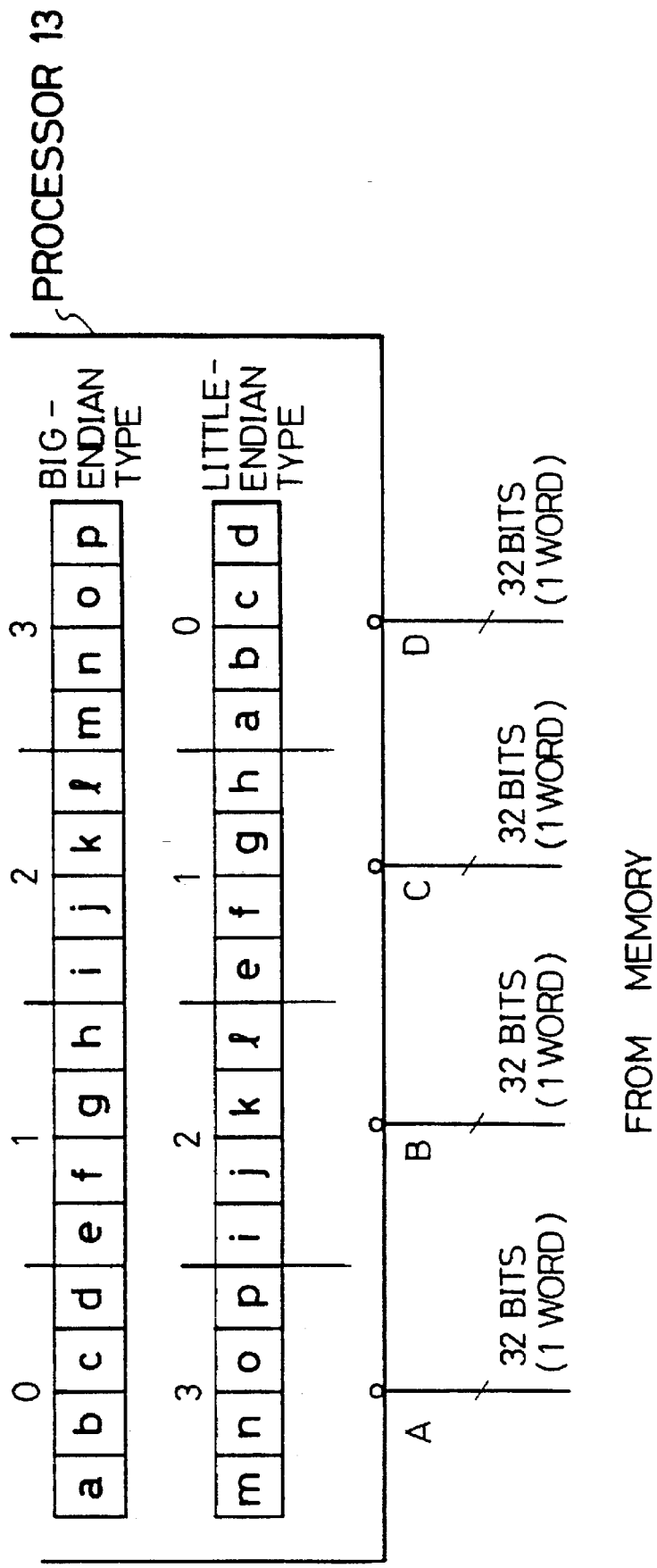
Figure 2:
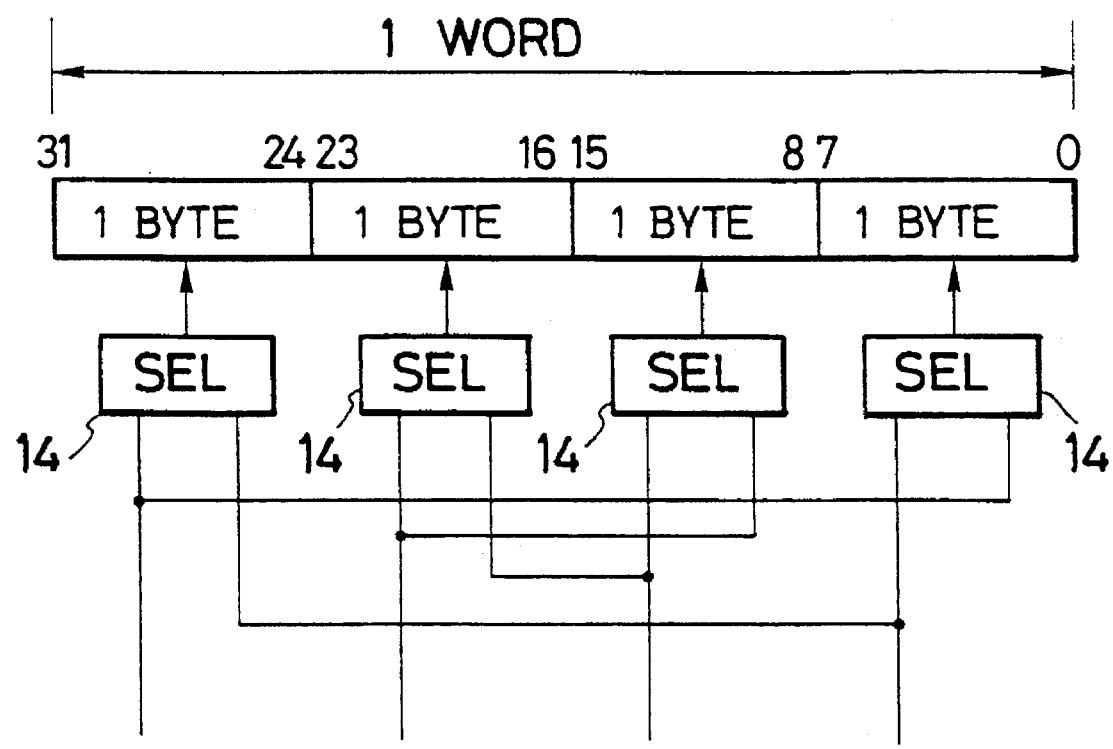
FIG. 2 is a circuit diagram showing a switching circuit provided-in a conventional processor.
Figure 3:
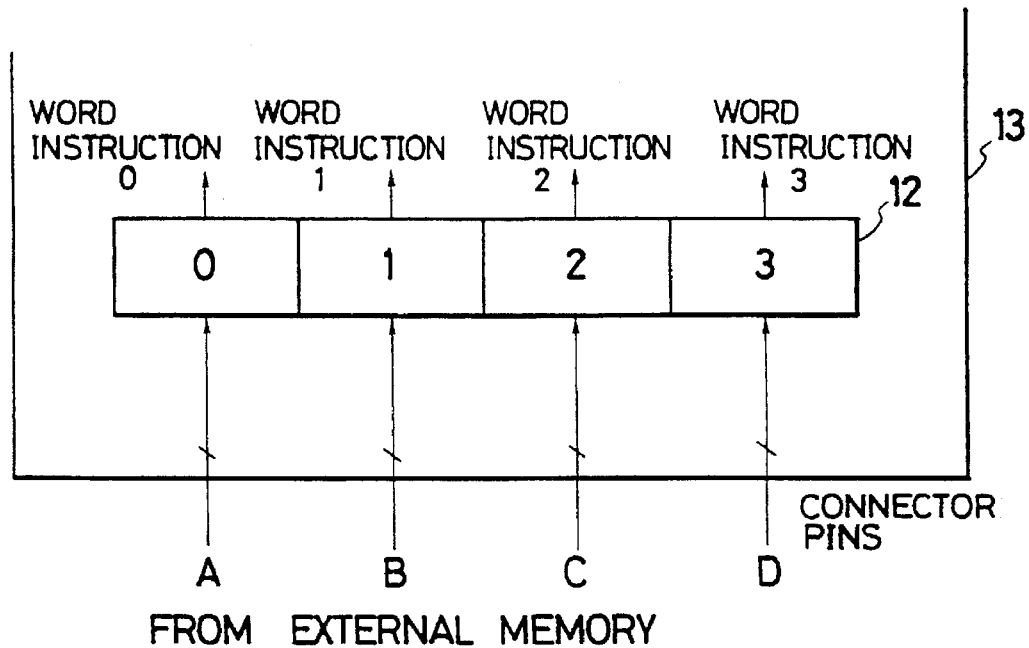
FIG. 3 is a diagram for explaining the conventional correspondence between the connector pins and the processor.
Figure 4:
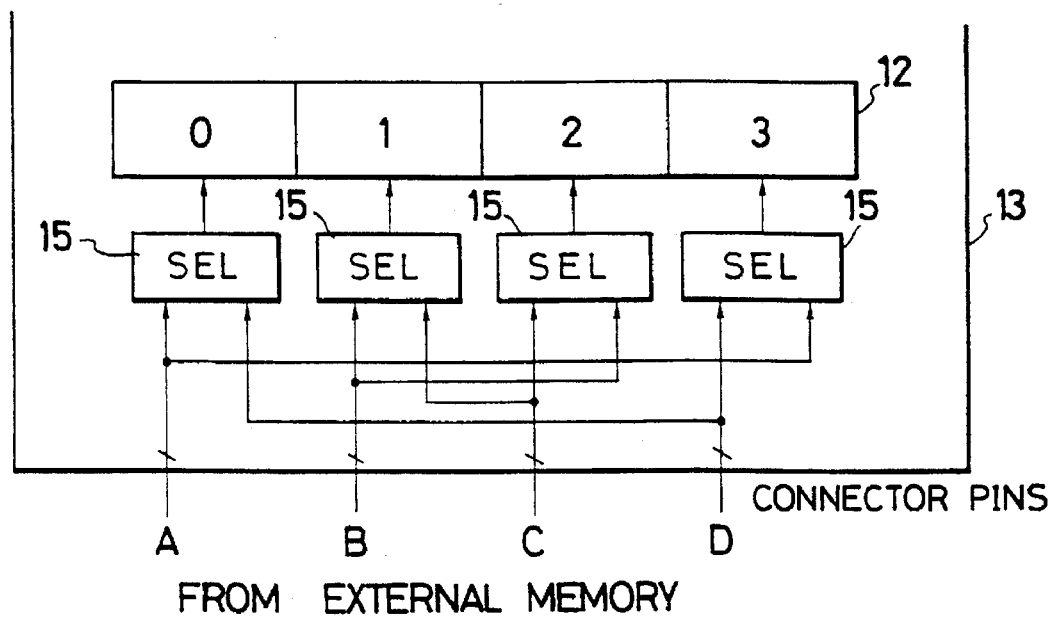
FIG. 4 is a diagram for explaining the conventional correspondence between the connector pins and the processor when a selector is provided within the processor.
Figure 5A:
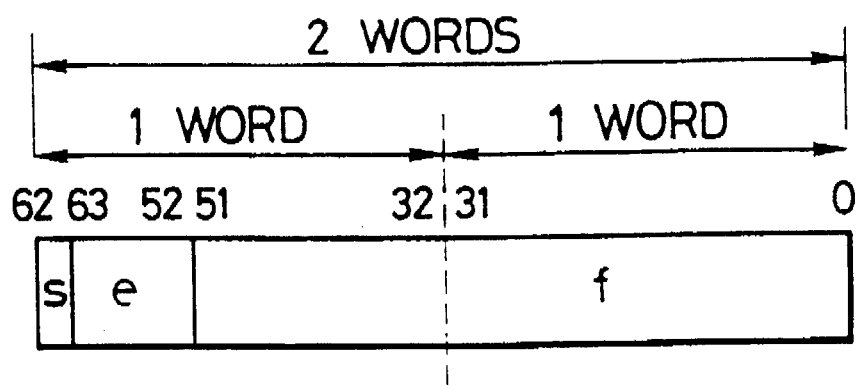
FIG. 5A and FIG. 5B are data configuration diagrams showing the format for double precision floating point data.
Figure 5B:
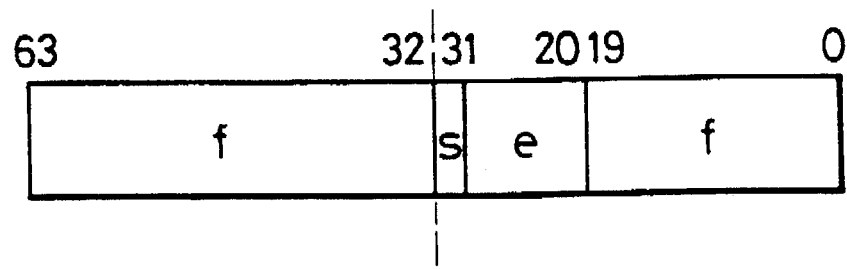
Figure 6:
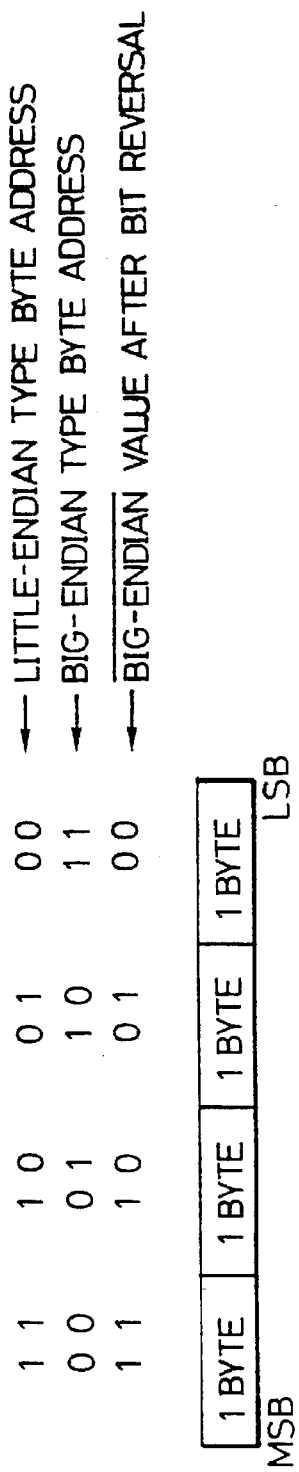
FIG. 6 is an explanatory drawing showing the correspondence of the byte addresses (two-bit) in the data processing device of the present invention.

FIG. 6 is an explanatory drawing showing the correspondence of the byte addresses (each designated by two bit data) for designating the address of the data for one byte in the data processing device of the present invention. In this drawing, three types of two-bit byte addresses are shown, the uppermost row being a little-endian type of byte address, the middle row being a big-endian type of byte address, and the lowermost row showing the byte address value after reversal of the big-endian bit. When this is done, one type becomes the same address to the other type on reversal.

Figure 7:
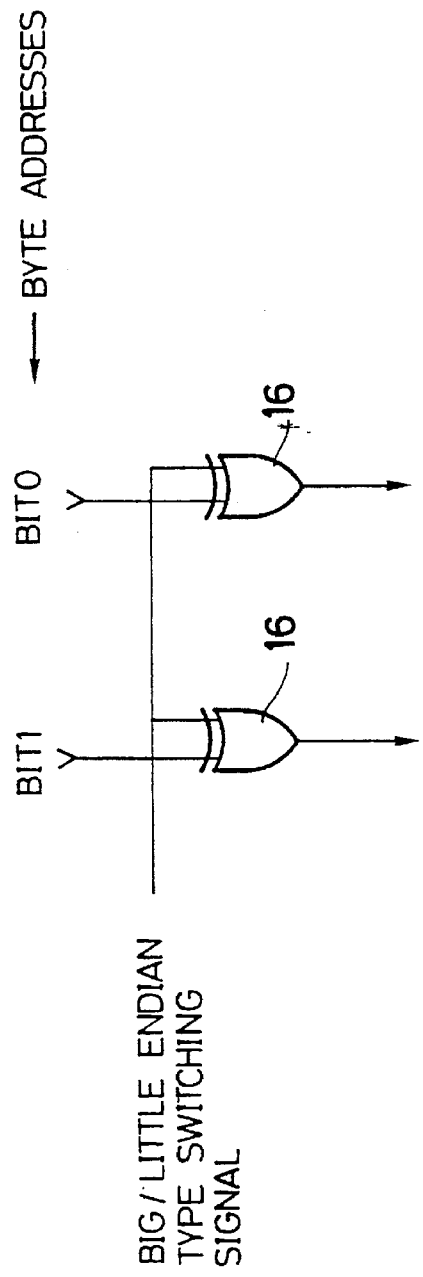
FIG. 7 is a circuit diagram showing a bit reversing circuit used in the data processing device of the present invention.
Figure 8:
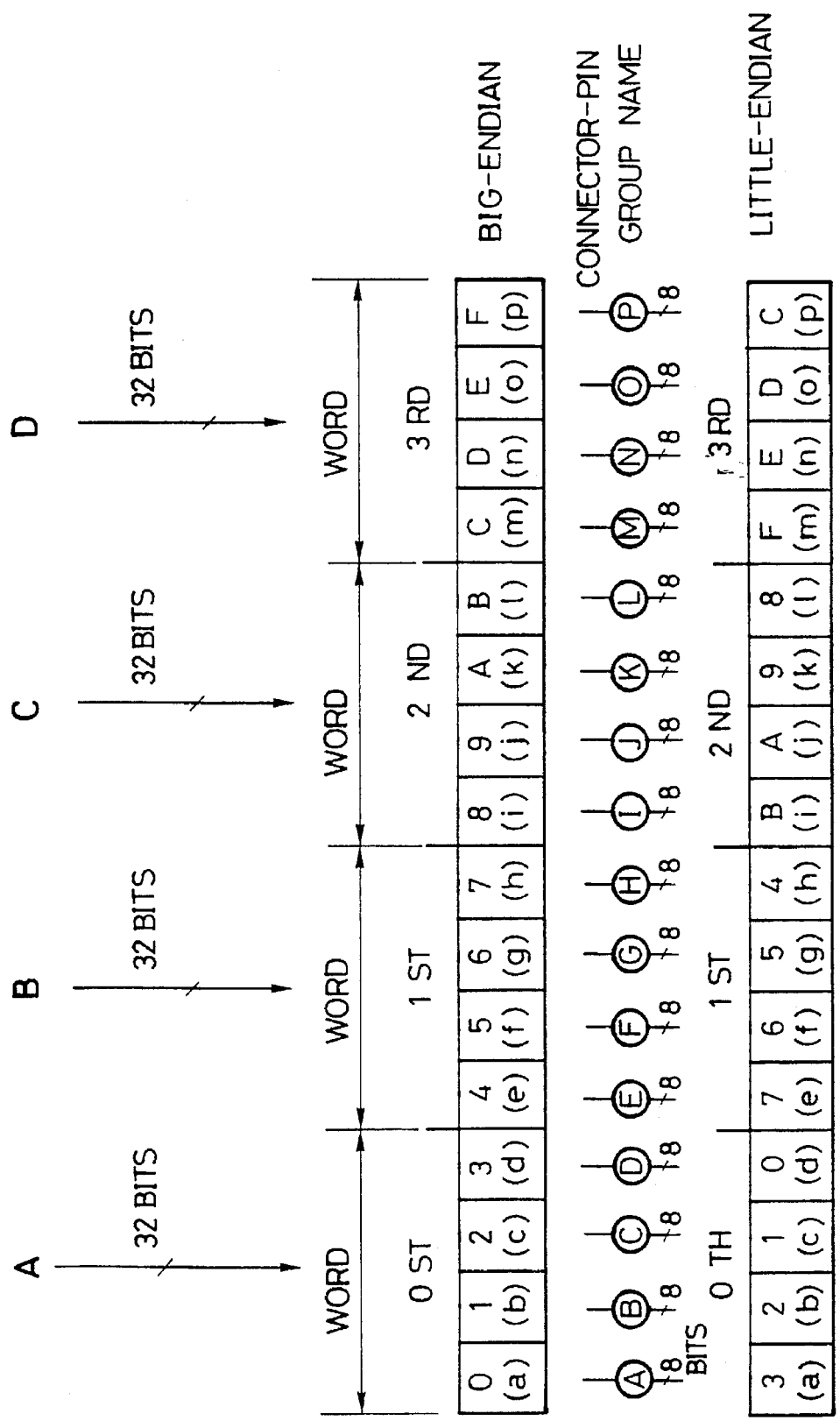
FIG. 8 is a diagram for explaining the correspondence between the data and the connector pins in the data processing device of the present invention.

Accordingly, by reversing the bits of the byte address, each piece of byte data shown by the byte address is accommodated at the same location in memory. The reversal circuit for the bits, as shown in FIG. 7, can be simply constructed in the form of an exclusive OR circuit. FIG. 8 is a diagram for explaining the correspondence between the data and the connector pins in the data processing device of the present invention. As a prerequisite, the word order is arranged by the above-mentioned byte address reversal. In FIG. 8, the uppermost row shows the order when the data is input (read out) from the external memory in which data is recorded in the big-endian type, the lowermost row shows the order when the data is input (read out) from the external memory in which data is recorded in the little-endian type, and the middle row shows the connector pins which connect the processor and the external memory.

The various items of data shown in the upper and lower rows are in the byte units. 0 to F are byte addresses prior to reversal, and (a) to (p) are identification elements for classifying the items of byte data. A plurality of connector pins (A) to (P) are provided in which each of the connector pin corresponds to a piece of data in byte units.

As can be understood from the diagram, when the big-endian type of data is input, the connector pin (A) is connected to the byte address 0 of the external memory, the of the connector pin (B) is connected to the byte address 1, and in the same manner, the remaining pins (C) to (P) are connected to the byte addresses 2 to F.

When the little-endian type of data is input, the pin (A) is connected to the byte address 3, the pin (B) is connected to the byte address 2, and in the same manner, the pins (C) and (D) are connected to the byte addresses 1 and 0; the pins (E), (F), (G), (H), to the byte addresses 7, 6, 5, 4; the pins (I), (J), (K), (L), to the byte addresses B, A, 9, 8; and the pins (M), (N), (0), (P), to the byte addresses C, D, E, F. In this manner, by varying the method of connecting the connector pins (A) to (P) corresponding to the endian type of the system, the consistency of the relationship between the byte data. Items (a) to (p) and the connector pins (A) to (P) is maintained, and the reversal of the order of the instruction is eliminated.

Figure 9:
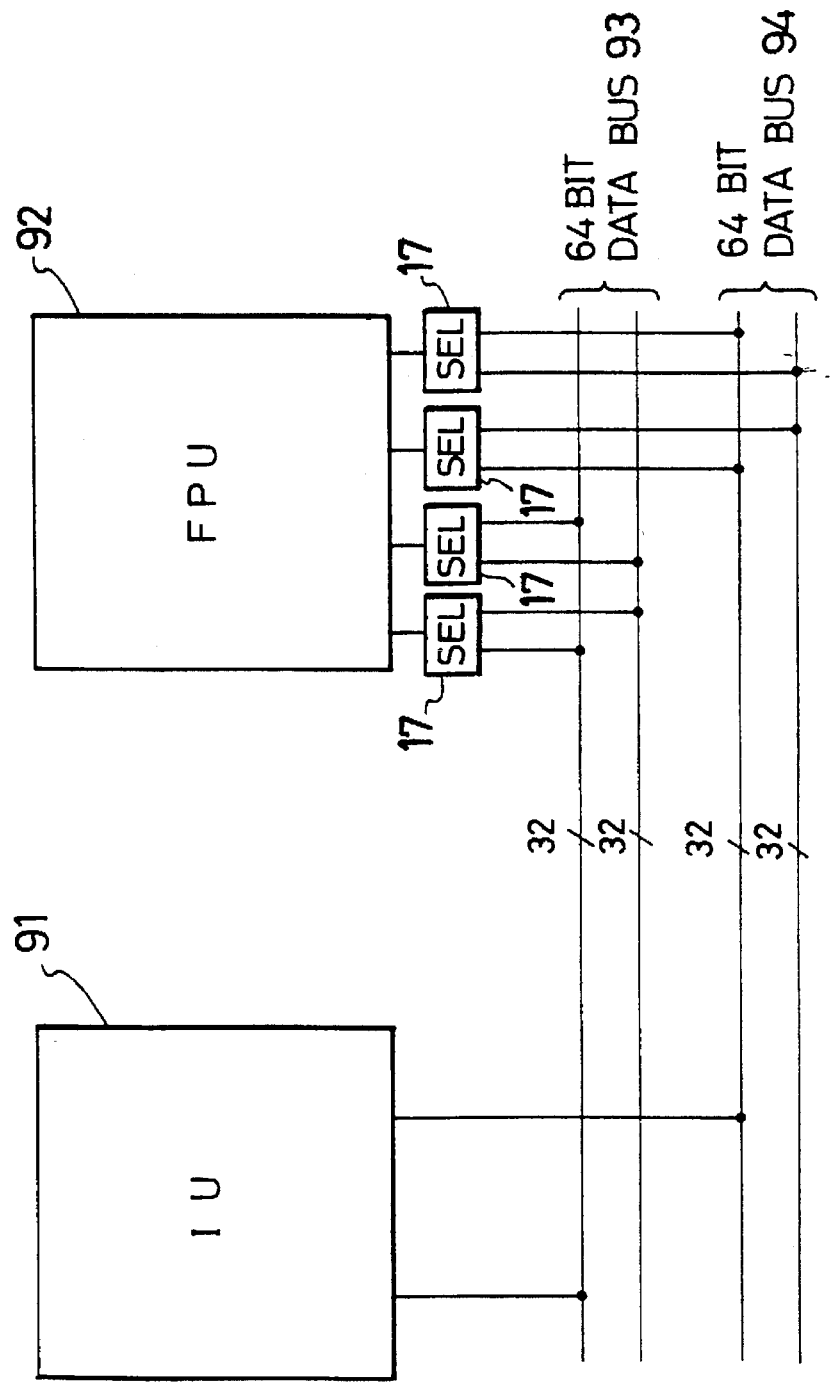
FIG. 9 is a block diagram showing the configuration of a computing element system for handling data of two or more words in series.

FIG. 9 is a block diagram showing the configuration of a computing element system for handling data of two or more words in series. An integer unit (IU) 91 and a floating point unit (FPU) 92 are connected through a 64-bit data bus 93 and a 64-bit data bus 94. A plurality of selectors (SEL) 17 is provided immediately before the input of the FPU2. Data is input to each of the selectors 17 in word units.

In this manner, the order of the word units of the data can be switched by the provision of the selectors 17, and correct data which is usually a series of two words can be obtained regardless of the difference in endian types.

As outlined above, by varying the method of connecting the connector pins (A) to (P), the conventional problems related to access of word units can be eliminated.

In addition, because the FPU2 is usually used with two words of data, the word units are switched to correspond to the endian type immediately before input to the FPU2. Because the switching can be specified dynamically, it is possible to handle data of either endian type.

As explained in the foregoing, in the data processing device of the present invention the method of connecting the connector pins can be varied to correspond to either an ascending or descending order of data which has been stored in an external memory.

As a result, the sequence of an instruction need not be reversed, and control by the processor is possible. In addition, it is always possible to handle data in series by providing means for switching data in word units immediately before input to a computing element.

What is claimed is:

1. A data arranging device for arranging plural n-byte data words while transferring the plural n-byte data words from an external memory means to a data processing means, comprising:

external memory means for storing first and second n-byte data words;

data bus means for connecting a data processing means with the external memory means;

data processing means having first and second input terminals for receiving the first and second n-byte data words from the data bus means and for performing operations on the first and second n-byte data words;

selector means for providing the first n-byte data word to the second input terminal and the second n-byte data word to the first terminal when the external memory means and data processing means represent data words differently and for providing the first n-byte data word to the first terminal and the second n-byte data word to the second terminal when the external memory means and the data processing means represent data words consistently.

2. A data processing device connected to a memory for receiving four words of data in parallel from said memory in a format for either a little-endian system or a big-endian system, one word of data being composed of four bytes of data, said data processing device converting four bytes of data in little-endian format to four bytes of data in big-endian format or vice versa when said data processing device generates data in big-endian format while data received from said memory is in little-endian format or vice versa, said data processing device comprising:

a bit reversing circuit which receives two bits of an address referencing one of four bytes within one word of the four words of data received from said memory, the bit reversing circuit including inverters for inverting said two bits of said address and replacing said two bits of said address with an inverted two bits; and a word reversing circuit connected to said memory for reversing an order of the four words of data received by said data processing device.

3. The data processing device as in claim 2, wherein said word reversing circuit of said data processing device comprises a selector for selectively exchanging a first word of said four words of data with a fourth word of said four words of data and for selectively exchanging a second word of said four words of data with a third word of said four words of data, wherein the exchanged first, second, third and fourth words are transferred to a floating point unit.

* * * * *